(12) United States Patent
Vijayasankar et al.

(10) Patent No.: US 9,602,394 B2
(45) Date of Patent: Mar. 21, 2017

(54) ROUTING FRAME PROPAGATION IN POWER LINE NETWORKS

(71) Applicant: Texas Instruments Incorporated, Dallas, TX (US)

(72) Inventors: Kumaran Vijayasankar, Allen, TX (US); Muhammad Owais Khan, Austin, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 183 days.

(21) Appl. No.: 14/663,415

(22) Filed: Mar. 19, 2015

(65) Prior Publication Data

US 2015/0271062 A1 Sep. 24, 2015

Related U.S. Application Data

(60) Provisional application No. 61/955,934, filed on Mar. 20, 2014.

(51) Int. Cl.
*H04W 4/00* (2009.01)
*H04L 12/721* (2013.01)
*H04B 3/54* (2006.01)
*H04L 12/707* (2013.01)

(52) U.S. Cl.
CPC ............ *H04L 45/26* (2013.01); *H04B 3/542* (2013.01); *H04L 45/124* (2013.01); *H04L 45/22* (2013.01)

(58) Field of Classification Search
CPC ....... H04L 45/22; H04L 45/26; H04L 45/124; H04B 3/542
See application file for complete search history.

(56) References Cited

U.S. PATENT DOCUMENTS

| | | | | |
|---|---|---|---|---|
| 7,401,217 B2 * | 7/2008 | Huang | ............... | H04L 63/0838 713/153 |
| 2007/0097892 A1 * | 5/2007 | Tsang | .................. | H04L 12/5695 370/310 |
| 2007/0248065 A1 * | 10/2007 | Banerjea | ................. | H04L 45/26 370/338 |
| 2008/0316951 A1 * | 12/2008 | Zeng | ....................... | H04L 45/00 370/312 |

(Continued)

OTHER PUBLICATIONS

Shuqiang Zhang, Wei Guo and Kai Wen, "On the Broadcast Storm Problems of Routing in Wireless Sensor Networks: A Cross-layer Design", WiCOM '08 4th International Conference on Wireless Communications, Networking and Mobile Computing, 2008, Dalian, China, Oct. 12-14, 2008 pp. 1-5.

(Continued)

*Primary Examiner* — Farah Faroul
(74) *Attorney, Agent, or Firm* — John R. Pessetto; Charles A. Brill; Frank D. Cimino

(57) ABSTRACT

Determination of a transmission through a network having a plurality of nodes using carrier sense multiple access collision avoidance (CSMA/CA) may be performed by broadcasting a route request (RREQ) packet from a source node that is targeted towards a destination node within the network, such that the RREQ is received by a first set of nodes in proximity to the source node. After first receiving a RREQ, each of the plurality of nodes rebroadcasts the RREQ after waiting a randomized amount of wait time. During each randomized wait time, the node suppresses all but one RREQ received by the node during the wait time.

22 Claims, 10 Drawing Sheets

(56) References Cited

U.S. PATENT DOCUMENTS

| | | | | |
|---|---|---|---|---|
| 2009/0238109 | A1* | 9/2009 | Byard | H04W 40/02 370/328 |
| 2010/0061272 | A1* | 3/2010 | Veillette | H04L 45/34 370/254 |
| 2010/0195535 | A1* | 8/2010 | Ziller | H04L 45/123 370/254 |
| 2012/0195431 | A1* | 8/2012 | Garcia Morchon | H04W 12/04 380/270 |
| 2013/0094398 | A1* | 4/2013 | Das | H04W 12/00 370/254 |
| 2013/0201891 | A1* | 8/2013 | Rodriguez | H04W 40/005 370/311 |
| 2014/0226579 | A1* | 8/2014 | Roy | H04W 40/02 370/329 |
| 2015/0124625 | A1* | 5/2015 | Aldrin | H04W 40/12 370/238 |
| 2015/0381475 | A1* | 12/2015 | Yamamoto | H04W 40/26 370/216 |

OTHER PUBLICATIONS

Yu-Chee Tsent, Sze-Yao Ni, and En-Yu Shih, "Adaptive Approaches to Relieving Broadcast Storms in a Wireless Multihop Mobile Ad Hoc Network", IEEE Transactions on Computers, vol. 52, No. 5, May 2003, pp. 545-557.

Marc Torrent-Moreno, Daniel Jiang, and Hannes Hartestein, "Broadcast Reception Rates and Effects of Priority Access in 802.11-Based Vehicular Ad-Hoc Networks", VANET '04 Proceedings of the 1st ACM International Workshop on Vehicular Ad Hoc Networks, Sep. 26-Oct. 1, 2004, Philadelphia, PA, pp. 10-18.

Sze-Yao Ni et al, "The Broadcast Storm Problem in a Mobile Ad Hoc Network", MobiCom '9 Proceedings of the 5th Annual ACM/IEEE International Conference on Mobile Computing and Networking, Seattle, WA, Aug. 15-19, 1999, pp. 151-162.

Ozan K. Tonguz et al, "On the Broadcast Storm Problem in Ad hoc Wireless Networks" BROADNETS 2006 3rd International Conference on Broadband Communications, Networks and Systems, 2006, San Jose, CA, Oct. 1-5, 2006 pp. 1-11.

T. Clausen et al, The Lightweight On-demand Ad hoc Distance-vector Routing Protocol—Next Generation (LOADng), Oct. 27, 2014, pp. 1-71.

Kaveh Razazian et al, "Enhanced 6LoWPAN Ad Hoc Routing for G3-PLC", 2013 IEEE 17th International Symposium on Power Line Communications and Its Applications, Johannesburg, South Africa, Mar. 24-27, 2013, pp. 137-142.

Zygmunt J. Haas, Joseph Y. Halpem, and Li (ERRAN) Li, "Gossip-Based Ad Hoc Routing", IEEE/ACM Transactions on Networking, vol. 14, No. 3, Jun. 2006, pp. 479-491.

Douglas S. J. De Couto et all, "A High-Throughput Path Metric for Multi-Hop Wireless Routing", Wireless Networks, vol. 11, No. 4, 2005, pp. 419-434.

Xin Ming Zhan et al, "A Neighbor Coverage-Based Probabilistic Rebroadcast for Reducing Routing Overhead in Mobile Ad Hoc Networks", IEEE Transactions on Mobile Computing, vol. 12, No. 3, Mar. 2013, pp. 424-433.

Jamal-Deen Abdulai et al, "Neighbour Coverage: A Dynamic Probabilistic Route Discovery for Mobile Ad Hoc Networks", SPECTS 2008 International Symposium on Performance Evaluation of Computer and Telecommunication Systems, 2008. Edinburgh, Scotland, Jun. 16-18, 2008, pp. 165-172.

Chunyu Hu, Yifei Hong, and Jennifer Hout, "On Mitigating the Broadcast Storm Problem with Directional Antennas", Proceedings of the IEEE International Conference on Communication (ICC), Seattle, WA, May 2003, vol. 1, pp. 104-110.

Wei Peng and Xi-Cheng Lu, "On the Reduction of Broadcast Redundancy in Mobile Ad Hoc Networks", MobiHoc '00 Proceedings of the 1st ACM International Symposium on Mobile Ad Hoc Networking and Computing, Nov. 2000, pp. 129-130.

Fred Stann et al, "RBP: Robust Broadcast Propagation in Wireless Networks", SenSys '06 Proceedings of the 4th International Conference on Embedded Networked Sensor Systems, Boulder, CO, Oct. 31-Nov. 3, 2006, pp. 85-98.

Jiwei Chen et al, "Robust Ad Hoc Routing for Lossy Wireless Environment", MILCOM 2006, IEEE Military Communications Conference, 2006, Washington, DC, Oct. 23-25, 2006, pp. 1-7.

"Narrowband Orthogonal Frequency Division Multiplexing Power Line Communication Transceivers for G3-PLC Networks" ITU-T Recommendation G.9903, Series G: Transmission Systems and Media, Digital Systems and Networks, Access Networks—In Premises Networks ITU-T Telecommunication Standardization Sector of ITU, Feb. 2014, pp. 1-226.

* cited by examiner

ROUTING FRAME PROPAGATION IN POWER LINE NETWORKS

CLAIM OF PRIORITY UNDER 35 U.S.C. 119(e)

The present application claims priority to and incorporates by reference U.S. Provisional Application No. 61/955,934, filed Mar. 20, 2014, entitled "ROUTING FRAME PROPAGATION BASED ON LEVELS, ROUTE COST AND WEAK LINKS."

FIELD OF THE DISCLOSURE

This disclosure generally relates to communication between devices using CSMA/CA communication protocols, and in particular to communication over power lines.

BACKGROUND OF THE DISCLOSURE

Smart Grid networks provide communication and automation over electrical grid infrastructure. It enables applications like automatic meter reading, on demand services and remote network monitoring among others. Power line communication (PLC) can operate over existing grid infrastructure reducing cost and providing a dedicated communication media for utility providers.

Both one-way and two-way systems have been successfully used for decades. Interest in this application has grown substantially in recent history because utility companies have an interest in obtaining fresh data from all metered points in order to better control and operate the utility grid. PLC is one of the technologies being used in Advanced Metering Infrastructure (AMI) systems.

A PLC carrier repeating station is a facility at which a PLC signal on a power line is refreshed. The signal is filtered out from the power line, demodulated and modulated, and then re-injected onto the power line again. Since PLC signals can carry long distances (several 100 kilometers), such facilities typically exist on very long power lines using PLC equipment.

In a one-way system, readings "bubble up" from end devices (such as meters), through the communication infrastructure, to a "master station" which publishes the readings. A one-way system might be lower-cost than a two-way system, but also is difficult to reconfigure should the operating environment change.

In a two-way system, both outbound and inbound traffic is supported. Commands can be broadcast from a master station (outbound) to end devices, such as meters, that may be used for control and reconfiguration of the network, to obtain readings, to convey messages, etc. The device at the end of the network may then respond (inbound) with a message that carries the desired value. Outbound messages injected at a utility substation will propagate to all points downstream. This type of broadcast allows the communication system to simultaneously reach many thousands of devices. Control functions may include monitoring health of the system and commanding power shedding to nodes that have been previously identified as candidates for load shed. PLC also may be a component of a Smart Grid.

The power line channel is very hostile. Channel characteristics and parameters vary with frequency, location, time and the type of equipment connected to it. The lower frequency regions from 10 kHz to 200 kHz are especially susceptible to interference. Furthermore, the power line is a very frequency selective channel. Besides background noise, it is subject to impulsive noise often occurring at 50/60 Hz, and narrowband interference and group delays up to several hundred microseconds.

OFDM is a modulation technique that can efficiently utilize this limited low frequency bandwidth, and thereby allows the use of advanced channel coding techniques. This combination facilitates a very robust communication over a power line channel.

IEEE's 1901 Broadband power line Standard was approved in 2010 and HomePlug AV, as baseline technology for the FFT-OFDM PHY within the standard, is now ratified and validated as an international standard. The HomePlug Powerline Alliance is a certifying body for IEEE 1901 products. The three major specifications published by HomePlug (HomePlug AV, HomePlug Green PHY and HomePlug AV2) are interoperable and compliant.

Another set of open standards has been developed for power line communication (PLC) at the request of Electricite Réseau Distribution France (ERDF), a wholly owned subsidiary of the EDF (Electricite de France) Group. The set of standards include "PLC G3 Physical Layer Specification," undated, ERDF; and "PLC G3 MAC Layer Specification," undated, ERDF. These standards are intended to facilitate the implementation of an automatic meter-management (AMM) infrastructure in France; however, PLC using these standards or similar technology may be used by power utilities worldwide.

The G3 standards promote Interoperability and coexists with IEC 61334, IEEE® P1901, and ITU G.hn systems. 10 kHz to 490 kHz operation complies with FCC, CENELEC, and ARIB. CENELEC is the European Committee for Electrotechnical Standardization and is responsible for standardization in the electro technical engineering field. ARIB is a Japanese standards organization.

Generally speaking, prior to transmitting a signal across power lines or wires, a PLC device may attempt to detect whether a given communication or access channel (e.g., frequency band) is currently in use. Channel access may be accomplished, for example, by using the Carrier Sense Multiple Access with Collision Avoidance (CSMA/CA) mechanism with a random backoff time.

BRIEF DESCRIPTION OF THE DRAWINGS

Particular embodiments in accordance with the disclosure will now be described, by way of example only, and with reference to the accompanying drawings.

DETAILED DESCRIPTION OF EMBODIMENTS OF THE DISCLOSURE

Figure 1:
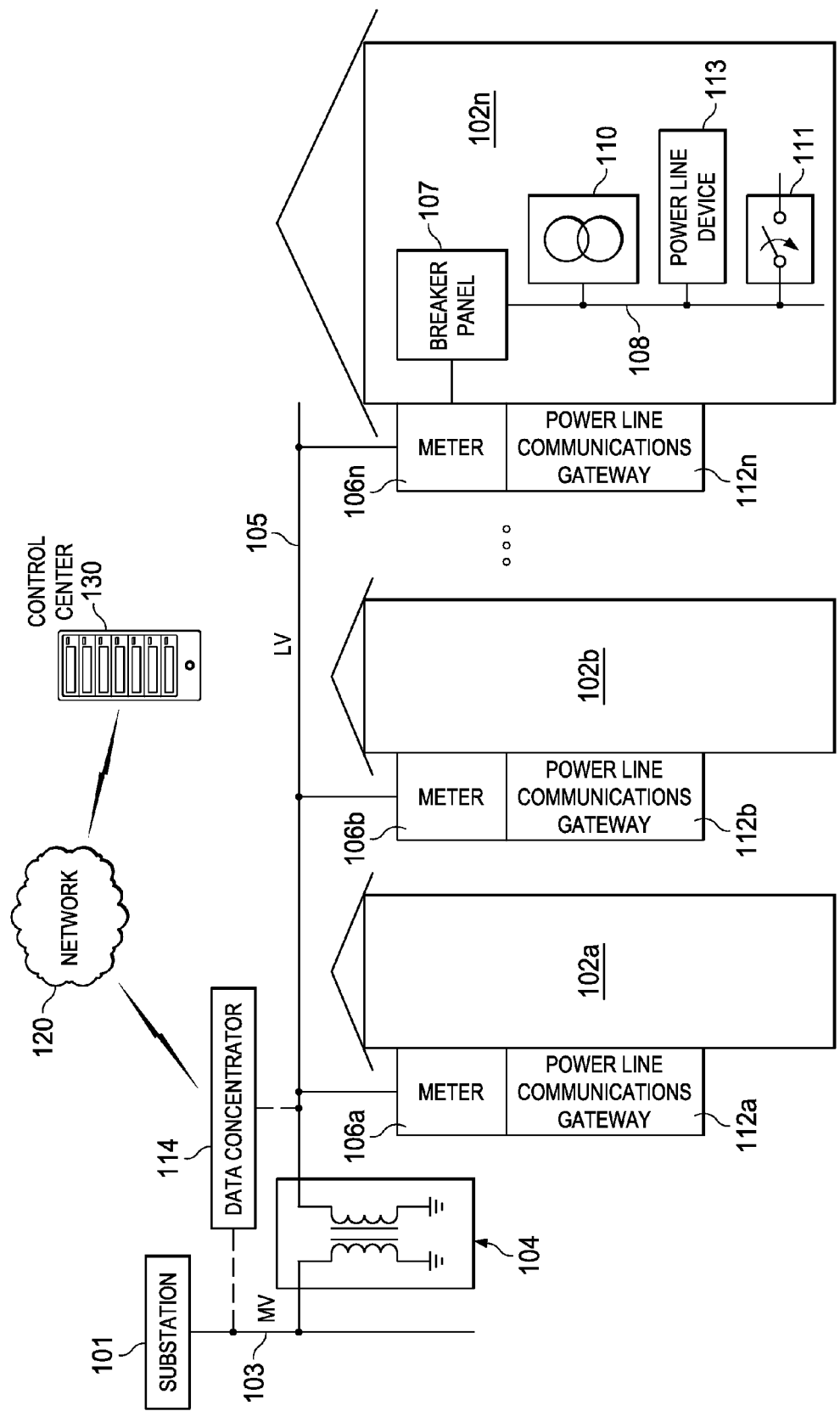
FIG. 1 is a conceptual diagram of a PLC system that uses an efficient routing technique as disclosed herein.

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In a typical distributed PLC network, a central coordinator device typically located at utility substation communicates to meters in a large number of homes. Each meter in a network has a limited coverage based on the physical layer and channel conditions requiring multiple hops to enable end to end communication. Smart Grid networks use different routing protocols to discover such multi-hop paths. Routing protocols can either be: reactive or proactive. Reactive protocols establish routes on demand for a target destination while proactive routing methods pre-establish routes for future multi hop data exchange. On demand routing protocols such as AODV and LOADng rely on route discovery message propagation throughout the network. This can lead to broadcast storms reducing network throughput and increasing loss due to collisions. Broadcast propagation by its inherent nature is susceptible to collisions and hence many times an optimal route may not be achieved as RREQ frames get lost. Also, in current protocols a node is generally required to retransmit every route request that it receives. This implies additional energy spent in transmission and retransmission of the packet resulting in increased energy consumption per node. A technique to improve reactive routing performance in a smart grid network is disclosed herein.

The problem of broadcast storm has been well studied in literature; see for example references [1], [2], and [3]. Some of these techniques rely on some coordination between nodes to achieve rebroadcast suppression and usually require a designated central authority. The solutions proposed which do not require a central authority simply employ randomness in forwarding times to achieve some kind of suppression. The first group of approaches requires a designated central authority and cannot be used in systems which do not support this coordination. The second group of approaches does not provide significant benefit.

LOAD (Lightweight On-demand Ad hoc Distance-vector Routing Protocol) is a simplified on-demand routing protocol based on Ad-hoc On-Demand distance Vector routing (AODV) that was drafted within the 6LoWPAN working group in IETF and is used as the base for G3-PLC and the ITU G9956 specification. LOADng (LOAD-Next Generation) is similar to LOAD and includes generation of RREQs by a LOADng Router, forwarding them until they reach the destination, generation of RREPs upon receipt of an RREQ by the indicated destination, and hop-by-hop forwarding of these unicast RREPs towards the originator. LOADng also includes blacklisting, separate forward and reverse routes, and an extension for route cost calculations. The "Lightweight On-demand Ad hoc Distance-vector Routing Protocol—Next Generation (LOADng)" draft, Oct. 27, 2014 is incorporated by reference herein.

Embodiments of the present disclosure include a wait mechanism that allows each node to wait for a designated period of time and to select a best RREQ from all those received and to discard the other RREQ frames that it has received. In this manner, network congestion may be reduced by promoting the selection of the best available route for each transaction request, as will be explained in more detail below.

CSMA/CA (Carrier Sense Multiple Access/Collision Avoidance) is the channel access mechanism used by most wireless LANs in the ISM bands. A channel access mechanism is the part of the protocol which specifies how the node uses the medium; when to listen, when to transmit.

CSMA/CA is derived from CSMA/CD (Collision Detection), which is the base of Ethernet. The main difference is the collision avoidance. On a wire, the transceiver has the ability to listen while transmitting and so to detect collisions. Typically, Ethernet transmissions have approximately the same strength. However, for wireless networks, even if a radio node could listen on the channel while transmitting, the strength of its own transmissions would mask all other signals on the air. Similarly, in the PLC environment, there is so much noise and other interference it is difficult to talk and listen at the same time. Therefore, the PLC protocol does not directly detect collisions like with Ethernet and instead tries to avoid them.

Recommendation ITU-T G.9903 from the Telecommunication Standardization Sector of the International Telecommunication Union contains the physical layer (PHY) and data link layer (DLL) specification for the G3-PLC narrowband orthogonal frequency division multiplexing (OFDM) power line communication transceivers for communications via alternating current and direct current electric power lines over frequencies below 500 kHz. ITU-T G.9903 (February 2014) is incorporated by reference herein.

The ITU-T G.9903 standard supports indoor and outdoor communications in the following environments: a.) low voltage lines (less than 1000 v), such as the line between a utility transformer and meter; b) through transformer low-voltage to medium-voltage (1000 V up to 72 kV); and c) through transformer medium-voltage to low-voltage power lines in both urban and in long distance (multi-kilometer) rural communications. The standard uses transmission frequencies less than 500 kHz. Data rates are scalable to 500 kbps depending on the application requirements. This standard addresses grid to utility meter, electric vehicle to charging station, and within home area networking communications scenarios.

FIG. 1 is a conceptual diagram of a PLC system in which an electric power distribution system is depicted. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, or location where electric power is received and/or consumed. A breaker panel, such as panel 107, provides an interface between meter 106*n* and electrical wires 108 within residence 102*n*. Electrical wires 108 deliver power to outlets 110, switches 111, and other electric devices within residence 102*n*.

The power line topology illustrated in FIG. 1 may be used to deliver high-speed communications to residences 102*a-n*. In some implementations, power line communications modems or gateways 112*a-n* may be coupled to LV power lines 105 at meter 106*a-n*. PLC modems/gateways 112*a-n* may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102*a-n*. Thus, by using existing electricity distribution systems to carry data signals, significant cost savings are possible.

PLC modems or gateways 112*a-n* at residences 102*a-n* use the MV/LV power grid to carry data signals to and from PLC data concentrator 114 without requiring additional wiring. Concentrator 114 may be coupled to either MV line 103 or LV line 105. Modems or gateways 112*a-n* may support applications such as high-speed broadband Internet links, narrowband control applications, low bandwidth data collection applications, or the like. In a home environment, for example, modems or gateways 112*a-n* may further enable home and building automation in heat and air conditioning, lighting, and security. Also, PLC modems or gateways 112*a-n* may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106*a-n*, 112*a-n*, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

CSMA/CA

Each PLC device will typically include a receiver with an analog front end configured to receive orthogonal frequency division multiplexing (OFDM) symbols from a power line and an OFDM demodulator. Each PLC device will also typically include a transmitter with an analog front end configured to couple OFDM symbols to the power line, and a modulator configured to produce the OFDM symbols representative of data.

Generally speaking, prior to transmitting a signal across power lines or wires 103, 105, and/or 108, a PLC device may attempt to detect whether a given communication or access channel (e.g., frequency band) is currently in use. Channel access may be accomplished, for example, by using the Carrier Sense Multiple Access with Collision Avoidance (CSMA/CA) mechanism with a random backoff time. The random backoff mechanism may spread the time over which PLC devices attempt to transmit, thereby reducing the probability of collision. In other words, each time a device wishes to transmit data frames, it may wait for a random period. If the channel is found to be idle or free, following the random backoff, the device may transmit its data. If the channel is found to be busy, following the random backoff, the device may wait for another random period before trying to access the channel again.

Carrier sense is a fundamental part of the distributed access procedure. Physical Carrier Sense (PCS) is provided by the PHY layer of a layered protocol stack upon detection of a preamble in the frame control header. In the latter case, a PCS signal is asserted long enough to be detected and a Virtual Carrier Sense (VCS) is asserted by a media access control (MAC) layer in the protocol stack. A virtual carrier sense mechanism may be provided by the MAC by tracking the expected duration of channel occupancy. Virtual carrier sense is set by the length of received packet or upon collision. In these cases, virtual carrier sense tracks the expected duration of the Busy state of the medium. The medium is to be considered Busy when the station is transmitting.

A collision is inferred when the transmitting station receives a something other than ACK or NACK response when a response is expected. The transmitting station must infer a Collision from the absence of any response to a transmission when a response is expected. Note that the absence of a response could also be the result of a bad channel. Since there is no way to distinguish between the two causes a Collision may be inferred.

However, due to the large number of nodes that may be present in a PLC network, there may be a lot of traffic during some periods. In this case, some nodes may end up waiting for long periods of time before they win a contention contest.

Figure 2:
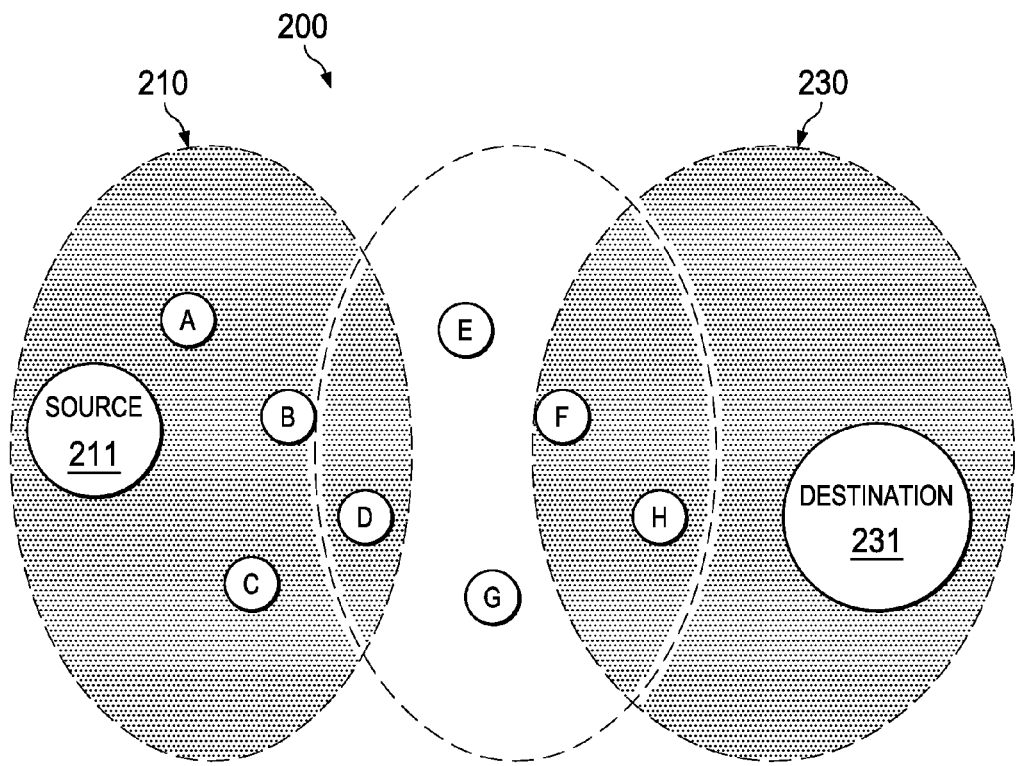
FIG. 2 is an illustration of an example network topology.

FIG. 2 is an illustration of an example network topology 200. Network topology 200 illustrates how a portion of a network, such as the PLC network in FIG. 1, may be organized. Topology 200 is merely illustrative; a typical PLC network will be much more complicated with hundreds or thousands of nodes, for example. In this example, network region 210 may be located within a subscriber residences, such as residence 102*n*, referring back to FIG. 1. Network region 230 may be coupled to a network control center, such as control center 130, for example. In this example, network operation will be described with respect to a network protocol defined by ITU-T G.9903 (February 2014). However, the routing concepts disclosed herein may be applied to other network protocols to improve routing efficiency.

In order for one node, such as source node 211, to contact another node in the network, such as destination node 231, a routing path through the network must be determined.

Figure 3:
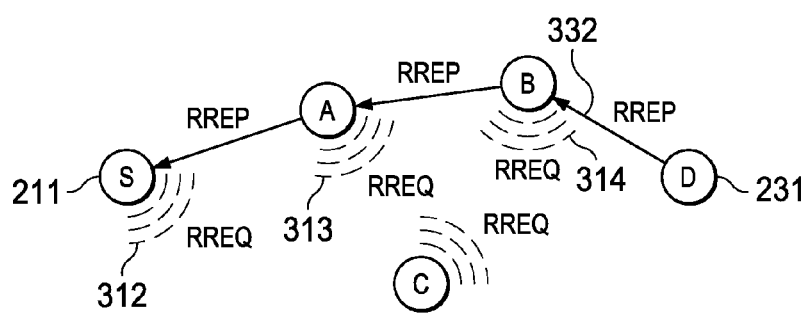
FIG. 3 is an illustration of route request frame broadcasting.

FIG. 3 is an illustration of route request frame broadcasting through a network, such as illustrated by FIG. 2. Routing from a source to a destination using a reactive protocol such as is specified for PLCs occurs with a RREQ frame 312 being generated by the source 211 that is broadcast to the entire network. Every other node that receives the broadcast RREQ frames then rebroadcasts the RREQ, as illustrated at 313, 314 for example, if that node is not the intended destination. If a node is the intended destination, then it transmits a RREP (routing reply) 332 back to the source in a unicast manner along the path in which it was received. When multiple RREQ copies are received by a node, then the RREQ with the best cost is rebroadcast. If a RREQ frame received later has a higher route cost, then it is dropped.

ITU-T G.9903 Baseline Routing Protocol

As defined by ITU-T G.9903, a RREQ frame is generated with a sequence number, originator address, destination address and hop count field (In some protocol variants a separate hop count field may not exist). The route cost field is set to zero. The weak link count is set to zero At each hop, the link cost for the link between the sender and the node is calculated and added it to the route cost in the RREQ frame to get an overall route cost to that node. If this is the first time a RREQ for the given source address and sequence number is observed, then the frame is sent for forwarding. If a RREQ for the same sequence number and source address was already observed then the overall cost is compared with the current cost. If the newer cost is higher the RREQ is silently dropped. If the newer cost is lower it is sent for forwarding.

At each node that forwards a RREQ frame, a routing table entry is created for the originator with the next hop as the sender address. If the node is the destination of the RREQ, then a RREP (Route Reply) frame is generated and sent to the next hop of the originator address in a unicast manner. If the node is not the destination address, the frame is rebroadcast after making the following changes: the route cost is field is updated to be the new route cost that is calculated; the Hop count field is incremented; and the weak link count is incremented if the LQI of the sender-node link is lower than a threshold denoting that the link is not good. Table 1 provides an example the frame formats for RREQ and RREP frames as defined in the LOADNG protocol as defined within the G3-PLC specification.

TABLE 1

Route Request (RREQ) and Route Reply (RREP) message field definitions

| Field | Length | Definition |
|---|---|---|
| Destination | 16 bits | Destination address of RREQ or RREP |
| Originator | 16 bits | Originator address of RREQ or RREP |
| Sequence-Number | 16 bits | Refers to RREQ.seq-num or RREP.seq-num (see Annex D). |
| Flags | 4 bits | Specifies the interpretation of the remainder message:<br>For RREQ messages:<br>bit 0 (route repair): when set ('1'), the RREQ message is used within a local repair procedure as described in clause 9.4.3.2.5.<br>bit 1 (unicast RREQ): when set ('1'), the RREQ message is forwarded in unicast along an already installed route towards RREQ.destination if such a valid route exists in the routing table. Otherwise, it is broadcasted.<br>bits 2 to 3 (reserved): shall be cleared ('0') on transmission and shall be ignored upon reception.<br>For RREP messages:<br>bit 0 (route repair): when set ('1'), the RREP message is used within a local repair procedure as described in clause 9.4.3.2.5.<br>bits 1 to 3 (reserved): shall be cleared ('0') on transmission and shall be ignored upon reception. |
| Metric Type | 4 bits | Metric type used for routing and shall be set to adpMetricType (see Table 9-25). |
| Route Cost | 16 bits | Cumulative link cost along the route towards the destination. Refers to RREQ.route-metric or RREP.route-metric. |
| Hop Count | 4 bits | Number of hops of the route. Refers to RREQ.hop-count or RREP.hop-count. |
| Weak Link Count | 4 bits | Total number of weak links which the message has traversed from RREQ.originator or RREP.originator. |

Under the current ITU-T G.9903 routing protocol, all nodes may end up rebroadcasting an incoming frame at the same time, increasing the chances of collision. Likewise, a node may have to forward multiple RREQ frames for the same route discovery increasing the number of total frames transmitted in the network.

Staggered Link Quality Routing Protocol

Embodiments of this disclosure may use a routing protocol that will be referred to herein as the Staggered Link Quality (SLQ) protocol. Embodiments of the SLQ protocol may include the following three protocol elements in order to achieve near-optimal network overhead reduction: a) link quality based delay; b) artificial ordering; and c) suppression of route requests.

For link quality based delay, each node that needs to rebroadcast the route request frame delays the retransmission for a time unit proportional to the link quality indicator (LQI) of the received link. Since the LQI for different nodes varies due to channel conditions, it results in an inherent randomization of the timing of RREQ frame re-broadcasts. By randomizing RREQ retransmission, collisions may be reduced. In addition to achieving randomization, use of LQI in this manner also inherently gives priority for RREQ transmission to nodes with better route costs. While the use of LQI for randomization is useful, other embodiments may utilize other route metrics that are not proportional to LQI to produce randomization.

Equation 1 illustrates a possible implementation of random delay based on LQI.

$$\text{Time delay} = \text{MIN\_Delay, if } LQI > \text{MAX\_LQI\_Threshold} \qquad (1)$$
$$= x1 * (\text{beta} - \text{alpha} * \text{link\_cost}) + x2,$$
$$\text{if received } LQI > \text{MIN\_LQI\_Threshold}$$

where, x1*(beta−alpha*link_cost)+x2 is chosen such that it is between MIN_Delay and MAX_delay
where MAX_Delay, if received LQI<=MIN_LQI_Threshold In this case, MIN_LQI_Threshold defines a LQI value below which the Link is not considered usable for transmission, MAX_LQI_Threshold is above which the link is good for transmission and no better performance can be achieved by having a higher value.

The MIN_Delay and MAX_delay should be chosen such that the overall delay when considering the maximum allowed hops in a network is still less than the maximum allowed route discovery time. Maximum route discovery time is the amount of time a source node is expected to wait for a RREP after transmitting a RREQ.

While the above example creates a random delay based on LQI, other embodiments may use a different scheme to produce random wait times. For example, in some embodiments a range of wait time may be defined between a minimum wait time and a maximum, and then each node may select a random wait time bounded by the wait time range.

In another embodiment, a node may use past history to determine a random delay for a RREQ received from a particular originator some embodiments. For example, a hop count may be used to further modify the random delay time; the hop count may be determined from a field in an incoming RREQ frame, for example.

Figure 4:
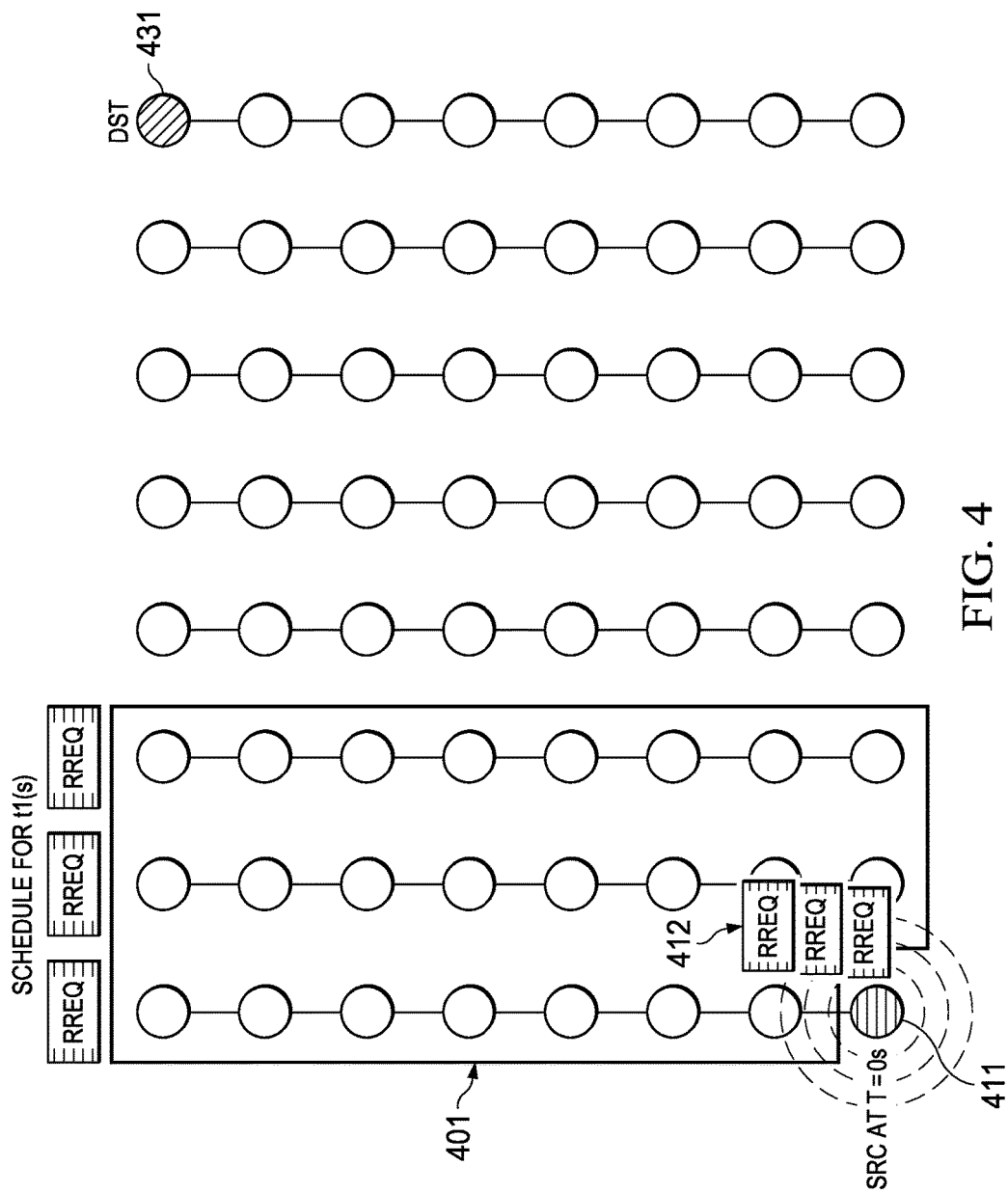
FIGS. 4-5 are illustrations of artificial ordering for route requests.
Figure 5:
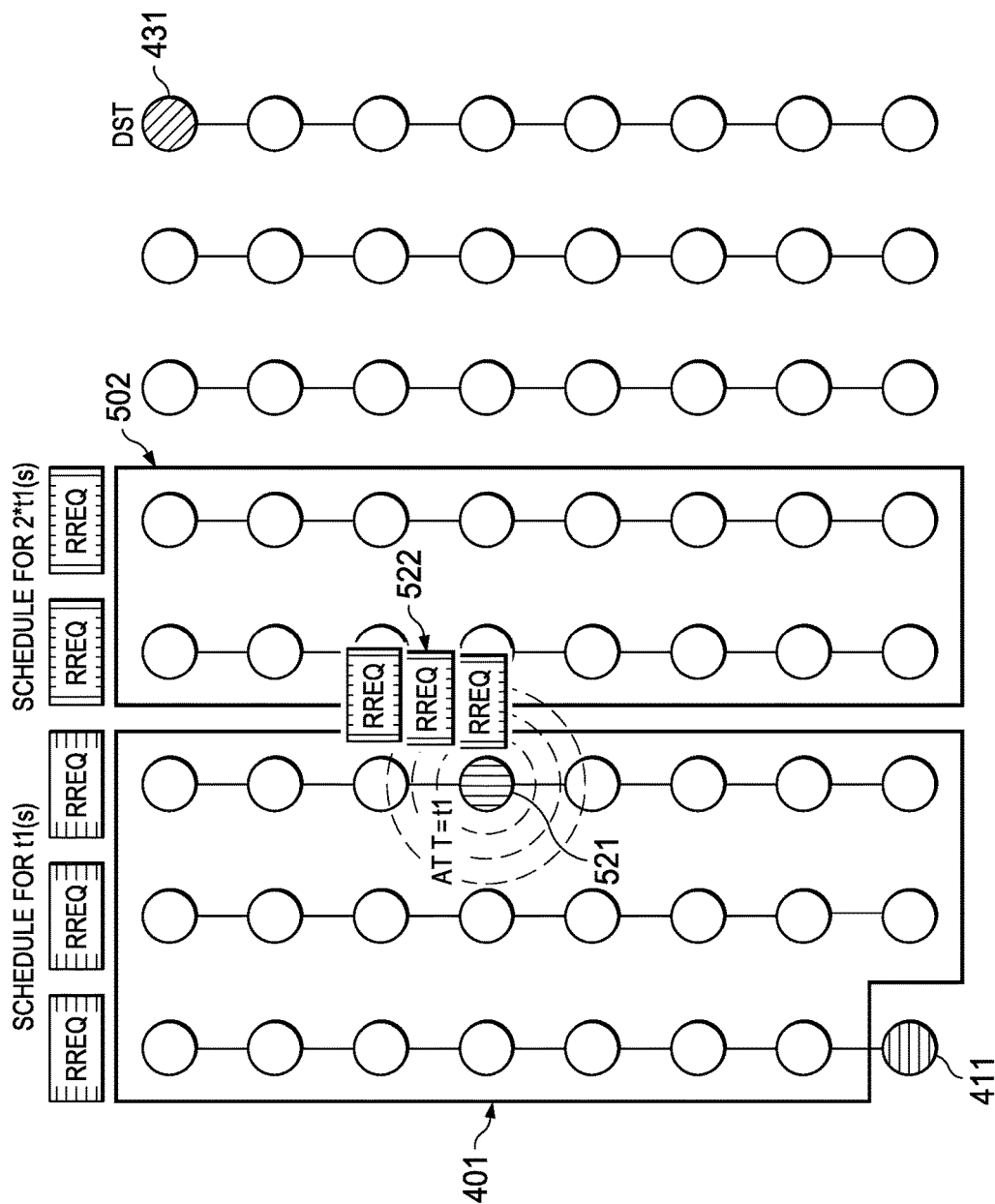

FIGS. 4-5 are illustrations of artificial ordering for route requests. As discussed above, when the originator of route discovery broadcasts a route request frame it is received by all the neighboring nodes. Each of these nodes (considered as level-0), contend with each other to rebroadcast this route request frame. When one of these nodes accesses the channel first and re-transmits the frame, another set of nodes also receive the route request frames. This new set of nodes also joins the list of now contending nodes, causing increased collisions. To prevent such a scenario, the nodes that decide to rebroadcast the RREQ frames choose a minimum delay that is non-zero and sufficient to account for link level broadcasts from all nodes in lower levels. Suppose t1 is such a delay value. Based on this approach, the nodes that receive the second route request frame may wait for a minimum delay of 2_t1, allowing nodes in a lower level to complete their transmissions.

For example, consider a topology of 8×8 nodes as shown in FIG. 4. In this figure a source node 411 generates a RREQ towards destination node 431. The following assumptions are made: a) each node can listen to transmission from nodes from its column and those on its sides up to two levels; b) nodes cannot sense the packet directly from nodes that are at least three columns away from it; and c) the link between a node from its column to adjacent column is better than that one that is two columns away. Based on these assumptions, an optimal route is a route that crosses through every column.

Referring still to FIG. 4, a RREQ 412 may be generated from source 411 to destination 431. Initially, RREQ is broadcast into the network, but as assumed above, only the nearby nodes in first level 401 will receive the initial broadcast. Each node in first level 401 that received the initial broadcast of RREQ 412 uses a non-zero delay (t1) to forward the RREQ. Thus, nodes that receive the RREQ 412 in the first level 401 will wait for t1 to forward the RREQ.

Referring to FIG. 5, it is assumed that the first re-broadcast RREQ 522 from a node in first level 401 is broadcast by node 521, for example. This RREQ 522 is received by nodes on a next level 502. Note, other nodes in first level 401 that are adjacent to node 521 will also receive this broadcast. The second level 502 nodes will wait for an additional t1 seconds, which produces a total delay=2t1 seconds from RREQ 412 origination before rebroadcasting the RREQ. This implies that for a time period of t1, only nodes in first level 401 will contend for the channel and not the ones in subsequent levels. This allows for a reduced number of collisions for the first level re-broadcast RREQs.

This pattern of waiting for additional time periods before each subsequent level of retransmission continues until a RREQ frame is received by destination node 431. This allows for a reduced number of collisions for each level re-broadcast RREQs.

Suppression of route requests may be used to prune the number of RREQ that are re-broadcast. While the Link cost based delay approach enables nodes with better link quality to transmit route request before others, it does not guarantee that route requests with lower overall route cost reaches a node first. The above two protocol elements delay the forwarding of the RREQ transmission. During the waiting period, a node may receive a RREQ which has a lower route cost. In this protocol element, the node may suppress the earlier RREQ and schedule the RREQ with a lower cost for forwarding with the appropriate delay. As it can be observed, suppression of route requests can be achieved with any randomization technique where a node can simply suppress a route request when a route request with better route cost is received. Importantly, when combined with protocol elements such as link cost based delay and artificial ordering of route request frames, it increases the chances of receiving a route request with better routing cost ahead of poorer route cost route request. As a result, a near optimal routing request performance may be produced.

Suppression of route requests may be further escalated in some embodiments in which a node need not rebroadcast the RREQ if it can determine that another node that has equivalent characteristics as the given node has already rebroadcast the RREQ. In some embodiments, this determination may be done statically, while in other embodiments the determination may be done dynamically.

In some embodiments, a static determination may be done to identify a cluster group in which each member node has similar link quality characteristics, for example. In this embodiment, the nodes may either be preconfigured or through exchange of messages find other nodes that have similar characteristics in terms of observed noise condition and physical location. For example, if the loss between two nodes A and B are negligible, then they can be assumed to be part of the same cluster. If a node observes a RREQ from a member of its cluster, it should then not rebroadcast the RREQ for the sequence number and originator. Node pre-configuration may be done by a system administrator or a hierarchical control module, for example.

In some embodiments, a node may dynamically determine if another node has equivalent characteristics as the given node in terms of relative position in network and link quality by using received routing frame information, for example. In this case, each node upon forwarding the routing frame may also include their received link quality while rebroadcasting the frame. On receiving a RREQ, the node may estimate the received link quality and compare the position of itself. If it can determine that it cannot provide a significantly better performance than the node from which it received the RREQ, it may drop the RREQ frame to reduce contention.

Simulation Results

The following metrics were chosen to analyze the performance of the SLQ routing protocol:

1) Routing overhead is defined as the number of RREQ messages that are transmitted by devices as part of the route discovery process.

2) Route formation time is defined as the time between the RREQ transmission and the RREP reception. When multiple RREP frames are generated for the same RREQ, the final RREP frame with the updated route cost is considered.

3) Route Optimality is defined as the percentage of the number of discovery attempts that result in an optimal path to the total number of route discoveries.

A simulation using an 8×8 array as described in FIG. 4 was performed for 100 route discoveries from source 411 to destination 431 to compare the performance of the SLQ routing protocol to a baseline routing protocol specified in the LOADng standard, which will be referred to as the Baseline protocol herein. LOADng uses both a route metric and hop count metric to determine the bidirectional routes. LOADng specifies that only the destination should respond to a RREQ frames and does not permit other nodes with route routing table entries to transmit a RREP. It offers features to handle asymmetric links by maintaining a list of neighbors to whom the link is found to be asymmetric called a black list. RREQ received from nodes belonging to black list are dropped to prevent routes with asymmetric links. Additionally G3-PLC specifies a metric called weak link count. A link is considered a weak link if the received link quality indicator (LQI) for that link is below a weak link threshold. A route with fewer weak links is preferred, even if the overall route metric or hop count metric is higher.

For the simulation, the default maximum route discovery wait time is 40 s and the maximum number of hops is 14 as per the specification. These factors limit the amount of randomization delay that can be applied. Too high a maximum delay per hop can result in not meeting the route discovery timeout while too low a value may not provide sufficient randomization in RREQ transmission. Taking this and the RREQ transmission times into account, the following parameters were chosen for the proposed SLQ algorithm.

$$\text{Delay} = 1{:}5s; LQI > wITh \quad (2)$$
$$= \max(400; f(LQI))\text{ms}; LQI \leq wITh$$

where, $$f(LQI)=850-(LQI-wITh)*50); \quad (3)$$

wITh=Weak Link Threshold; and

Minimum delay is capped at 400 ms to enable artificial ordering.

Figure 6:
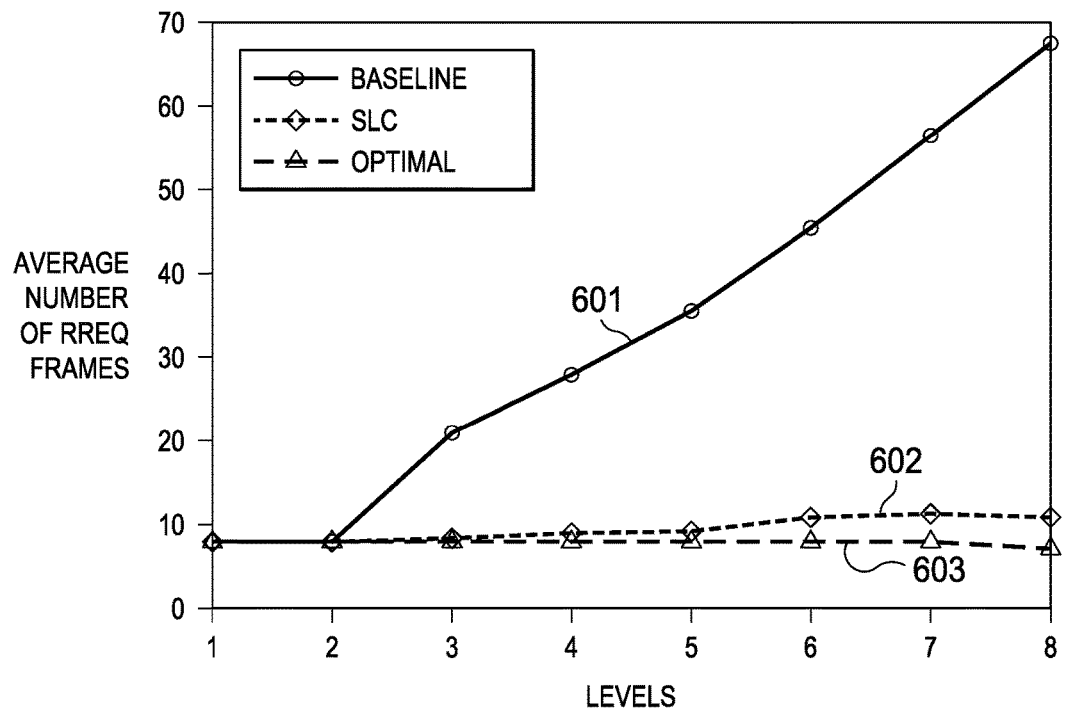
FIGS. 6-8 are plots illustrating simulation results.

FIG. 6 is a plot illustrating an average number of route request frames for the Baseband protocol 601 and the SLQ route discovery protocol 602 for a simulated exercise of 100 route discoveries. In each attempt, the number of RREQ transmissions at each level is captured. An optimal scenario 603 would be the case where each node transmits only one RREQ per route discovery. For the Baseline approach since every received RREQ with a better route cost is rebroadcasted and that the number of such options keeps increasing as the number of levels increases, an exponential increase in RREQ transmission across levels is observed. On the other hand, the disclosed SLQ approach ensures that a node waits to analyze all possible route options before forwarding the optimal RREQ. This enables the SLQ approach to result in a routing overhead that is 85% lower than Baseline 601 and is also close to optimal value 603. As the number of levels increases, the delay with which better route option reaches a node increases and may go beyond the delay value chosen by a node. Hence, a node at a later level might transmit a RREQ before receiving all possible route options causing the SLQ to deviate from optimal value at farther levels. However, since each RREQ transmission is individually delayed, the SLQ approach does not deviate much from optimal value even at higher levels.

Figure 7:
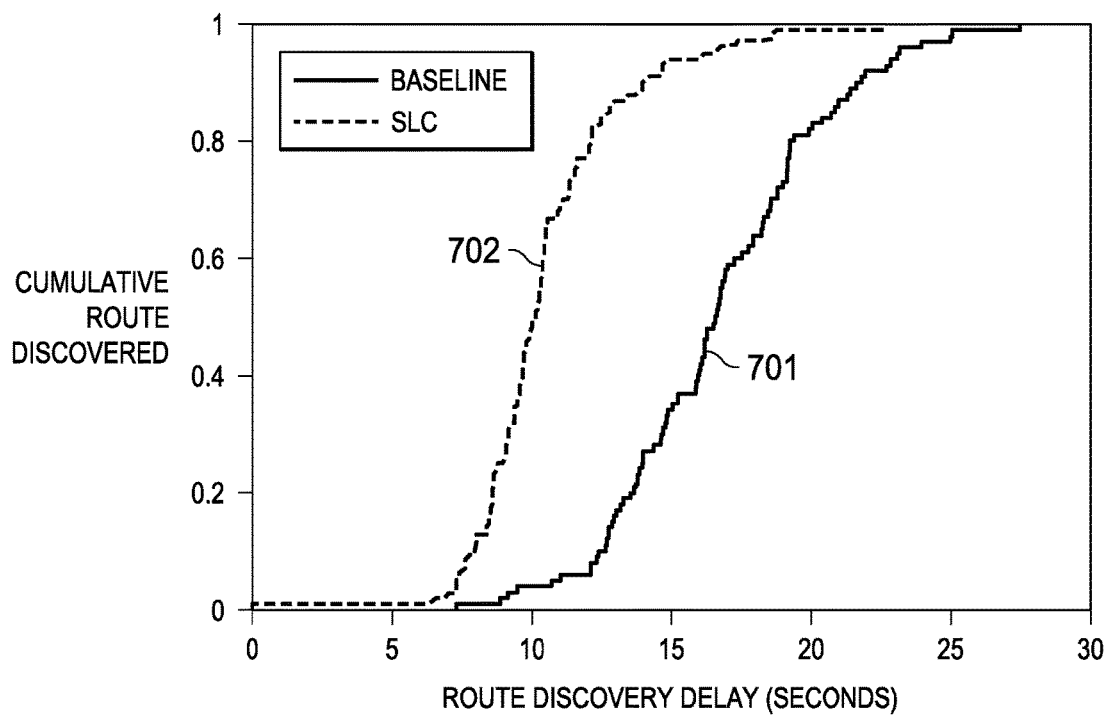

FIG. 7 is a plot illustrating the cumulative distribution function (CDF) of the route discovery delay. As it can be observed, SLQ results in a lower route discovery delay with a high probability as opposed to Baseline approach, as indicated by plot lines for Baseline 701 and SLQ 702. This is achieved due to the reduced number of RREQ transmissions in the network. The median delay for Baseline and SLQ approach is 16 s and 10 s respectively resulting in a 37.5% reduction in route formation delay. In the simulated test setup, the optimal path is the one that uses a node in each column. Such a path would result in least number of hops with zero weak links. Since the links between nodes of subsequent columns are identical, the choice of routing matrix does not affect the optimality of the path from source to destination.

Figure 8:
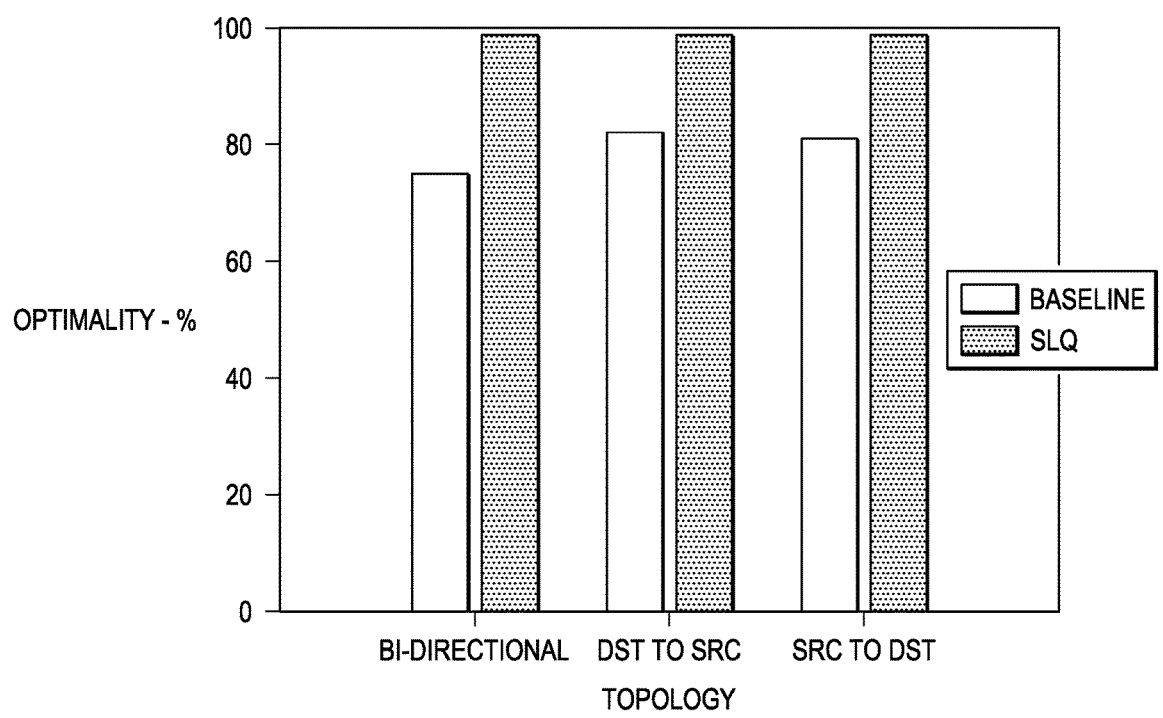

FIG. 8 illustrates the optimality of the resultant paths for the Baseline and SLQ approaches. It should be noted that the discovered path may not be always symmetric due to loss of RREQ or RREP with a better cost by collisions or channel errors before reaching the destination. This would result in a slight difference in the routing tables between the nodes that forwarded the RREQ/RREP frames and the nodes that did not receive the RREQ/RREP frame. The results illustrated in FIG. 8 illustrate the optimality of the path in source to destination, destination to source and bi-directional paths. It can be observed that SLQ not only results in reduced routing overhead and route formation delay but also ensures that the discovered routes are optimal in all three cases. As described above in more detail, SLQ achieves these results by reducing the number of RREQ transmissions and artificial ordering that enables reduced collisions at each level thereby protecting a RREQ with a better route cost. SLQ also benefits due to a link cost based delay that allows nodes with better route cost to rebroadcast the RREQ first.

Interoperability

The disclosed SLQ algorithm does not depend on any change in the underlying baseline routing protocol or on any specific message exchanges from other nodes. It is thus interoperable with legacy nodes that do not use the SLQ approach. However, the level of performance improvement in terms of reduced network overhead depends on the number of nodes that support the SLQ feature. To study the interoperability of the proposed mechanism and also the level of performance benefit that can be achieved in such cases, two additional network configurations were simulated, a mixed network with alternate levels (MNwAL) and a mixed network with alternate nodes (MNwAN). The test setup is the same as described above. In the MNwAL case, nodes that are in alternate columns use SLQ approach to rebroadcast the RREQ while in the MNwAN case, every other node uses the SLQ approach. Table 2 shows comparison of the average routing overhead, route formation delay, and bi directional path optimality for all four scenarios. It can be observed that mixed network yields better performance when compared to Baseline approach. The MNwAN scenario offers a better performance when compared to that of MNwAL as artificial ordering works better in the former case. Also, the optimal path requires only one node from each level, and the MNwAN offers four such nodes at each level that uses SLQ approach increasing the probability of achieving the optimal path.

TABLE 2

Backward Compatibility

|  | Baseline | MNwAL | MNwAN | SLC |
|---|---|---|---|---|
| Average RREQ Broadcasts | 270 | 170 | 148 | 76 |
| Route Formation Delay(s) | 16.7 | 12 | 10.6 | 10.6 |
| Bidirectional Route Optimality |  |  |  |  |
| Bidirectional Route Optimality | 75 | 80 | 85 | 99 |

Figure 9A:
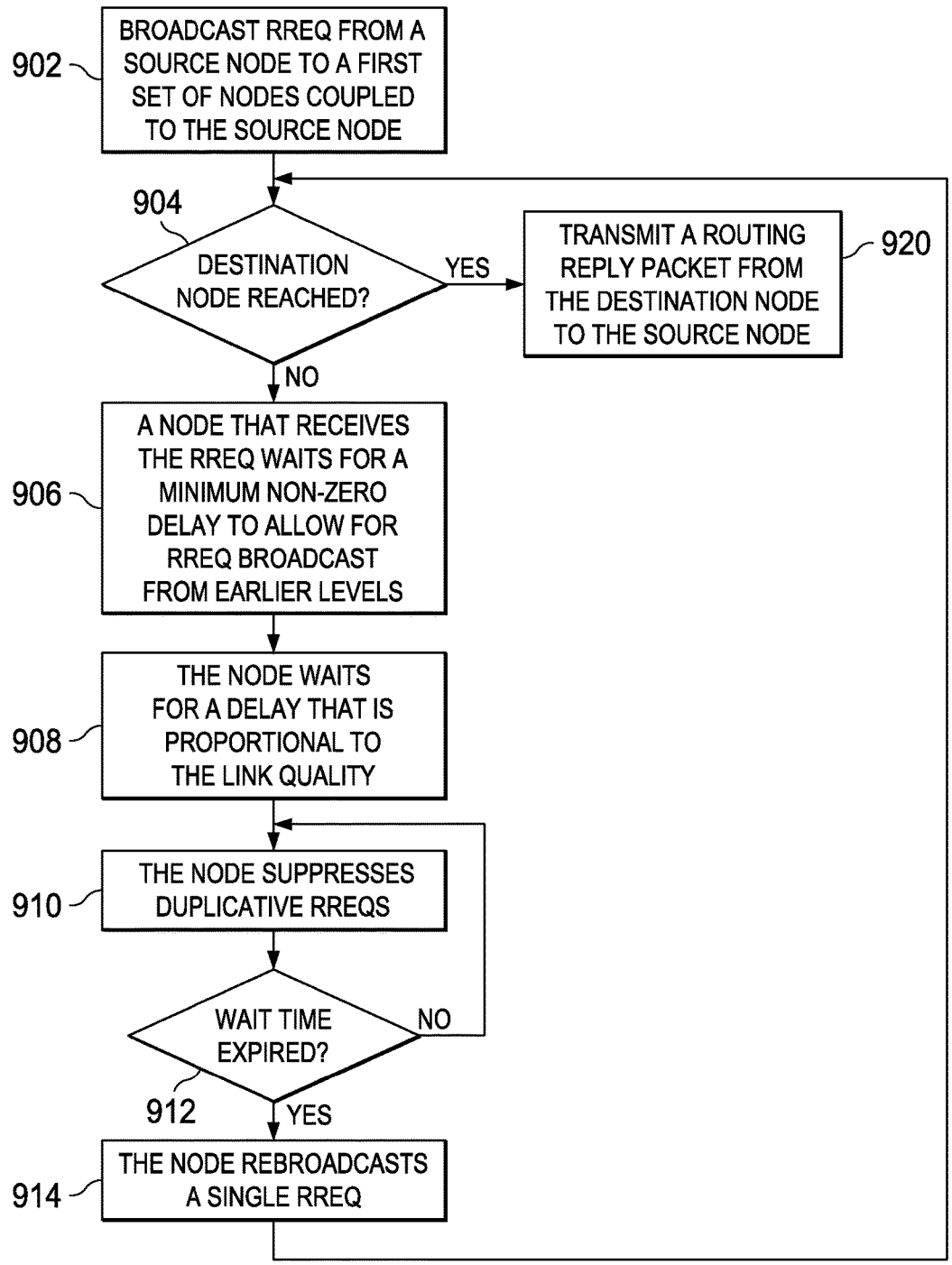
FIG. 9A-9B are flow diagrams illustrating operation of the SLQ routing protocol.

FIG. 9A is a flow diagram illustrating operation of the SLQ routing protocol for use in a network such as illustrated in FIGS. 1-2. Initially, a source node may broadcast 902 a routing request packet that targets a destination node. This initial broadcast is received by a first set of nearby nodes, which may also be referred to as a first level of nodes, as described with regard to FIGS. 4-5.

Each node that receives the RREQ then waits 906 for at least a minimum non-zero amount of delay time to allow for RREQ broadcasts from earlier levels. Furthermore, a node may wait 908 for an additional randomized amount of wait time before rebroadcasting the RREQ. While the node is waiting, it suppresses 910 all but one received RREQ.

Once the delay timer expires 912, the node rebroadcasts 914 only the RREQ that has a more favorable link quality indication to a next level of nodes. Each node updates the RREQ to include accumulated routing information that includes the link over which it received the RREQ.

The wait time 908 may be proportional to a link quality indicator for a communication channel link between a node that transmitted the RREQ and the node that received the RREQ, for example.

The wait time 908 may be proportional to a number of hops between the source node that originated the RREQ and the node that received the RREQ, for example.

The wait time may have a minimum value 906 that is sufficient to account for all rebroadcasts of the RREQ from the source node by the first set of nodes in order to produce an artificial ordering of rebroadcasts, as described in more detail with regard to FIG. 4-5.

Figure 9B:
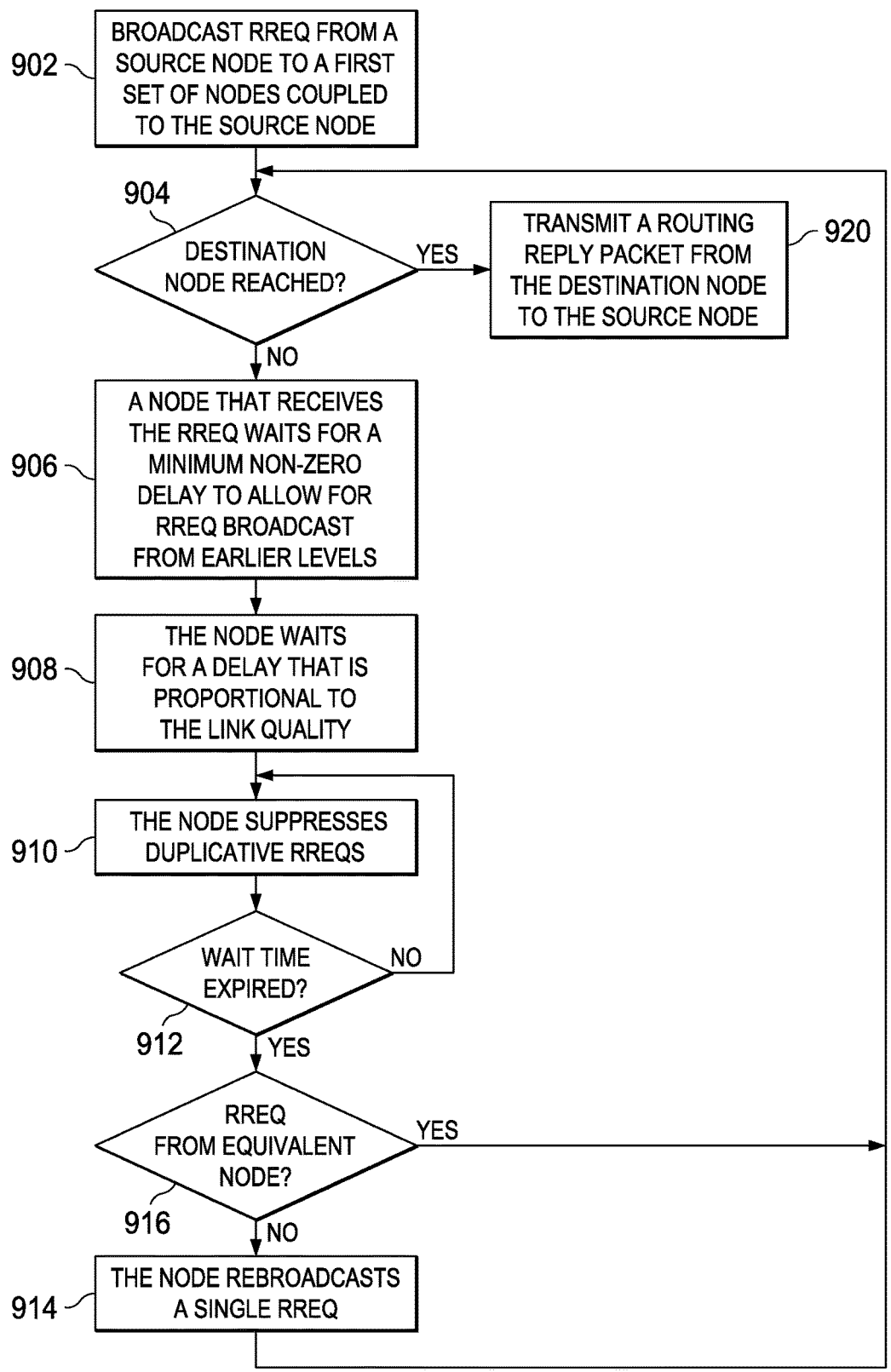

FIG. 9B illustrates an optional technique that may be used in some embodiments, In this case, if a node determines 916 that a RREQ has been received from a node that is relatively equivalent nature in terms of position in network and link quality, then it suppress all RREQ for that route discovery. As described above in more detail, suppression of route requests may be further escalated in some embodiments in which a node need not rebroadcast the RREQ if it can determine that another node that has relatively equivalent nature in terms of position in network and link quality has already rebroadcast the RREQ. In some embodiments, this determination may be done statically, while in other embodiments the determination may be done dynamically.

The process continues repeatedly until the destination nodes receives 904 a RREQ. The destination node then transmits 910 a routing reply packet back to the source node using the routing information that has been accumulated in the RREQ.

Device Examples

Figure 10:
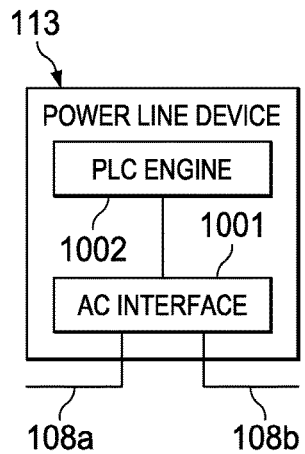
FIG. 10 is a block diagram of an example PLC device or modem for use in the PLC system of FIG. 1.

FIG. 10 is a block diagram of PLC device or modem 113, referring back to FIG. 1, that may include an embodiment of the SLQ routing protocol described herein. As illustrated, AC interface 1001 may be coupled to electrical wires 108a and 108b inside of premises 112n in a manner that allows PLC device 113 to switch the connection between wires 108a and 108b off using a switching circuit or the like. In other embodiments, however, AC interface 1001 may be connected to a single wire 108 (i.e., without breaking wire 108 into wires 108a and 108b) and without providing such switching capabilities. In operation, AC interface 1001 may allow PLC engine 1002 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 1002 may be configured to transmit and/or receive PLC signals over wires 108a and/or 108b via AC interface 1001 using a particular channel or frequency band. In some embodiments, PLC engine 1002 may be configured to transmit OFDM signals, although other types of modulation schemes may be used. As such, PLC engine 1002 may include or otherwise be configured to communicate with metrology or monitoring circuits (not shown) that are in turn configured to measure power consumption characteristics of certain devices or appliances via wires 108, 108a, and/or 108b. PLC engine 1002 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 1002 may receive instructions and/or other information from such higher-level PLC devices encoded in PLC signals. Communication interface 1001 includes control logic that is configured to participate in route discovery using the SLQ routing protocol as described in more detail above.

Communication interface 1001 includes a receiver coupled to the control logic. The receiver includes an analog front end configured to receive orthogonal frequency division multiplexing (OFDM) symbols from a power line and an OFDM demodulator. A transmitter is also coupled to the control logic. The transmitter includes an analog front end configured to couple OFDM symbols to the power line, and a modulator configured to produce the OFDM symbols representative of data.

Figure 11:
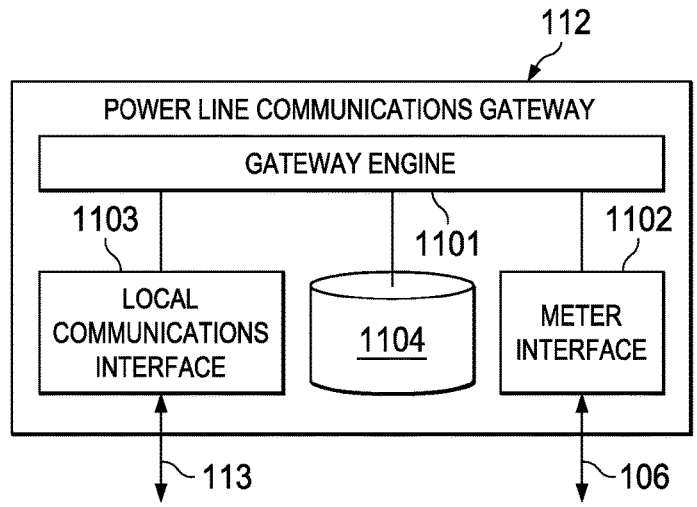
FIG. 11 is a block diagram of an example PLC gateway for use in the PLC system of FIG. 1.

FIG. 11 is a block diagram of PLC gateway 112, referring back to FIG. 1, that may include an embodiment of the SLQ routing protocol described herein. As illustrated in this example, gateway engine 1101 is coupled to meter interface 1102, local communication interface 1103, and frequency band usage database 1104. Meter interface 1102 is coupled to meter 106, and local communication interface 1104 is coupled to one or more of a variety of PLC devices such as, for example, PLC device 113. Local communication interface 1104 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 1101 may be configured to collect communications from PLC device 113 and/or other devices, as well as meter 106, and serve as an interface between these various devices and PLC data concentrator 114.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 1104 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 1101 may use database 1104 in assigning, allocating, or otherwise managing frequency bands assigned to its various PLC devices. Communication interface 1103 is configured to participate in route discovery using the SLQ routing protocol as described in more detail above.

Communication interface 1103 includes a receiver coupled to the control logic. The receiver includes an analog front end configured to receive orthogonal frequency division multiplexing (OFDM) symbols from a power line and an OFDM demodulator. A transmitter is also coupled to the control logic. The transmitter includes an analog front end configured to couple OFDM symbols to the power line, and a modulator configured to produce the OFDM symbols representative of data.

Figure 12:
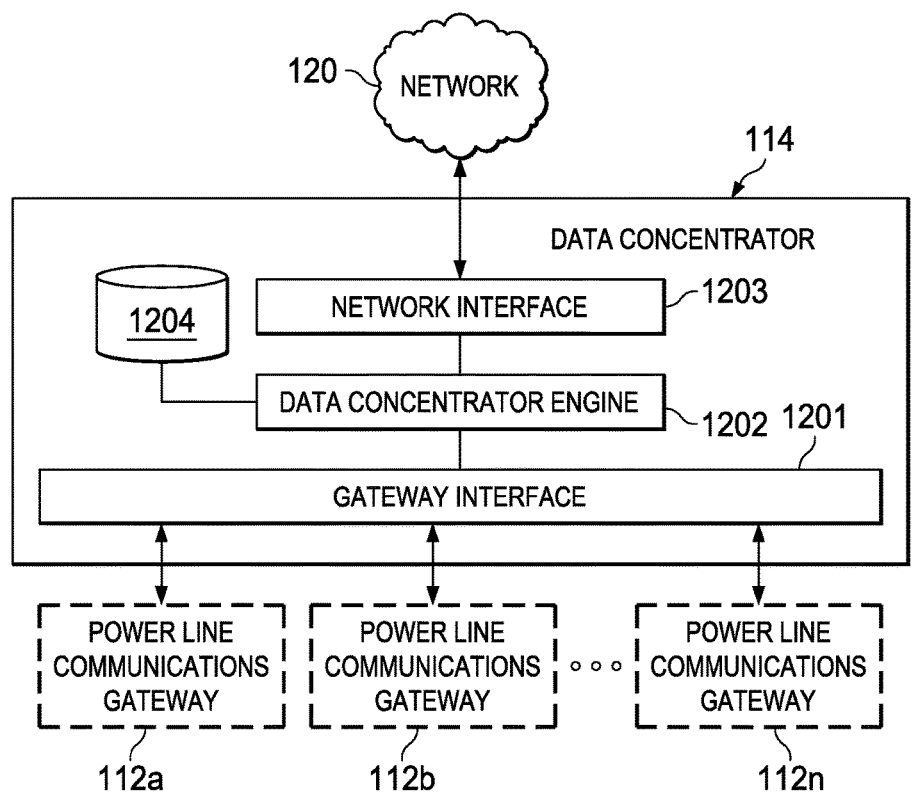
FIG. 12 is a block diagram of an example PLC data concentrator for use in the PLC system of FIG. 1.

FIG. 12 is a block diagram of a PLC data concentrator 114, referring back to FIG. 1, that may include an embodiment of the SLQ routing protocol described herein. Gateway interface 1201 is coupled to data concentrator engine 1202 and may be configured to communicate with one or more PLC gateways 112a-n. Network interface 1203 is also coupled to data concentrator engine 1202 and may be configured to communicate with network 120. In operation, data concentrator engine 1202 may be used to collect information and data from multiple gateways 112a-n before forwarding the data to control center 130. In cases where PLC gateways 112a-n are absent, gateway interface 1201 may be replaced with a meter and/or device interface (now shown) configured to communicate directly with meters 116a-n, PLC devices 113, and/or other appliances. Further, if PLC gateways 112a-n are absent, frequency usage database 1204 may be configured to store records similar to those described above with respect to database 1104. Gateway interface 1201 is configured to participate in route discovery using the SLQ routing protocol as described in more detail above. Gateway interface 1201 includes multiple receivers coupled to the control logic. Each receiver includes an analog front end configured to receive orthogonal frequency division multiplexing (OFDM) symbols from a power line and an OFDM demodulator. Multiple transmitters are also coupled to the control logic. The transmitter includes an analog front end configured to couple OFDM symbols to the power line, and a modulator configured to produce the OFDM symbols representative of data.

Figure 13:
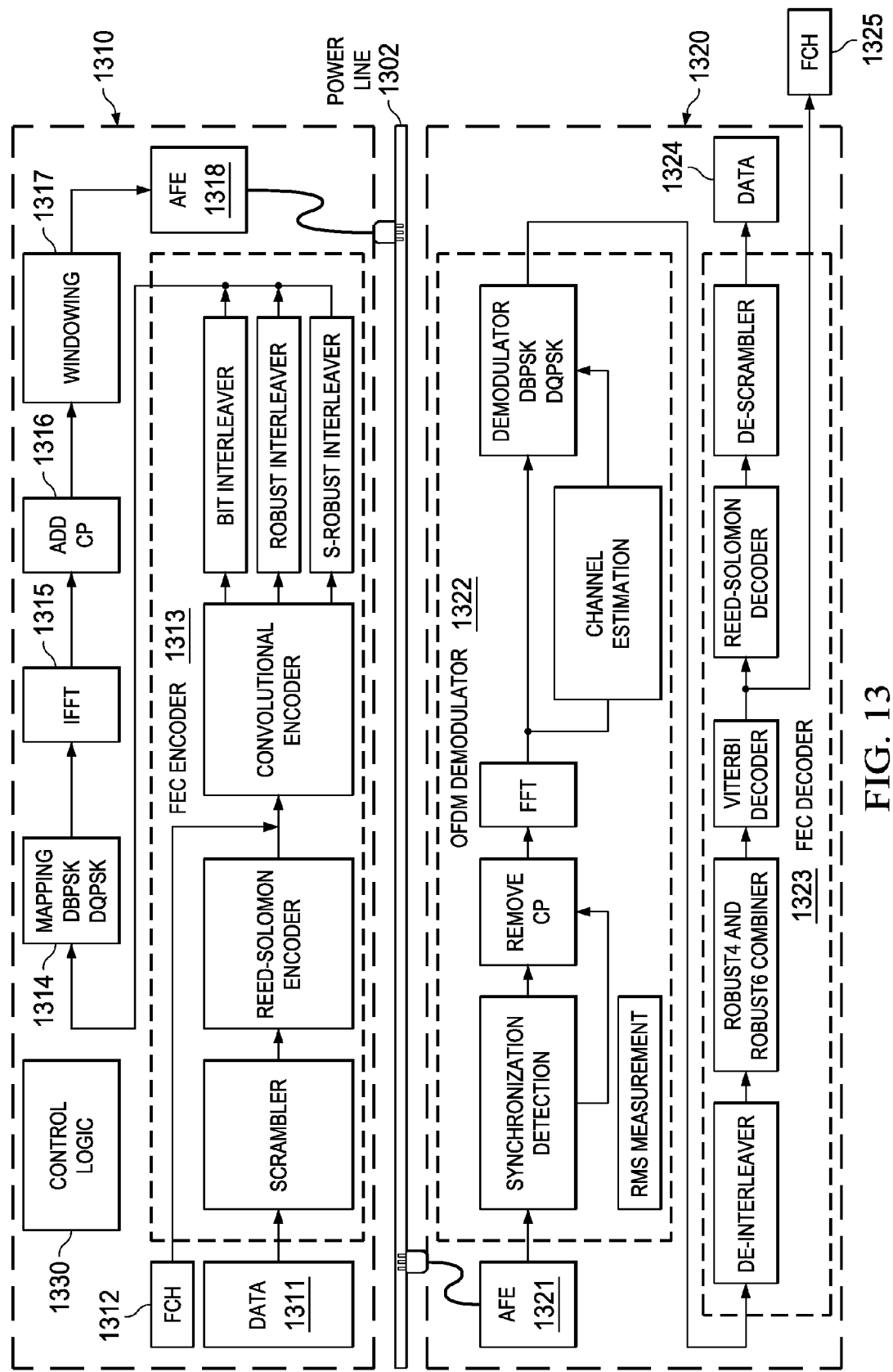
FIG. 13 is a block diagram illustrating a transmitter and receiver for use in power line communication nodes.

FIG. 13 is a block diagram illustrating an OFDM transmitter 1310 and receiver 1320 for use in a power line communication node for PLC over a power line 1302. Transmitter 1310 and receiver 1320 may be used in the devices described in FIGS. 10-12, for example. The power line channel is very hostile. Channel characteristics and parameters vary with frequency, location, time and the type of equipment connected to it. The lower frequency regions from 130 kHz to 200 kHz used in G3 PLC are especially susceptible to interference. Furthermore, the power line is a very frequency selective channel. Besides background noise, it is subject to impulsive noise often occurring at 50/60 Hz, and narrowband interference and group delays up to several hundred microseconds.

OFDM is a modulation technique that can efficiently utilize the limited bandwidth specified by CENELEC, and thereby allows the use of advanced channel coding techniques. This combination facilitates a very robust communication over a power line channel.

The CENELEC bandwidth is divided into a number of sub-channels, which can be viewed as many independent PSK modulated carriers with different non-interfering (orthogonal) carrier frequencies. Convolution and Reed-Solomon coding provide redundancy bits allowing the receiver to recover lost bits caused by background and impulsive noise. A time-frequency interleaving scheme may be used to decrease the correlation of received noise at the input of the decoder, providing diversity.

Data 1311 and a frame control header 1312 are provided by an application via a media access layer (MAC) of the G3 communication protocol. An OFDM signal is generated by performing IFFT (inverse fast Fourier transform) 1315 on the complex-valued signal points that are produced by differentially encoded phase modulation from forward error correction encoder 1313 using Reed Solomon encoding. Tone mapping 1314 is performed to allocate the signal points to individual subcarriers. An OFDM symbol is built by appending a cyclic prefix (CP) 1316 to the beginning of each block generated by IFFT 1315. The length of a cyclic prefix is chosen so that a channel group delay will not cause successive OFDM Symbols or adjacent sub-carriers to interfere. The OFDM symbols are then windowed 1317 and impressed on power line 1302 via analog front end 1318. AFE 1318 provides isolation of transmitter 1310 from the 50/60 Hz power line voltage.

Similarly, receiver 1320 receives OFDM signals from power line 1302 via AFE 1321 that isolates receiver 1320 from the 50/60 HZ power line voltage. OFDM demodulator 1322 removes the CP, converts the OFDM signal to the time domain using FFT (Fast Fourier Transform), and performs demodulation of the phase shift keyed (DBPSK, DQPSK) symbols. FEC decoder 1323 performs error correction using Reed Solomon decoding and then descrambles the symbols to produce received data 1324. Frame control header 1325 information is also produced by FEC decoder 1320, as defined by the G3 PLC standard.

A blind channel estimation technique may be used for link adaptation. Based on the quality of the received signal, the receiver decides on the modulation scheme to be used, as defined in the G3 PLC standard. Moreover, the system differentiates the subcarriers with bad SNR (signal to noise ratio) and does not transmit data on them.

An embodiment of the SLQ routing protocol, as described above in more detail, is implemented by control logic 1330.

Control logic for transmitter 1310 and receiver 1320 may be implemented using a digital signal processor (DSP), or another type of microprocessor, that is executing control software instructions stored in memory that is coupled to the microprocessor, for example, to perform FEP encoding, mapping and OFDM modulation, demodulation and FEP decoding. In other embodiments, portions or all of the transmitter or receiver may be implemented with hardwired control logic, for example. The analog front ends 1318, 1321 require analog logic and isolation transformers that can withstand the voltage levels present on the power line.

A G3 PLC system is specified to have the ability to communicate in both low voltage (LV) power lines, typically 100-240 VAC, as well as medium voltage (MV) power lines (up to approximately 12 kV, by crossing LV/MV transformers. This means that the receiver on the LV side must be able to detect the transmitted signal after it has been severely attenuated as a result of going through a MV/LV transformer. As the signal goes through the transformer it is expected to experience overall severe attenuation in its power level as well as frequency-dependent attenuation that attenuates higher frequencies. Both transmitter and receiver have mechanisms to compensate for this attenuation. The transmitter has the capability to adjust its overall signal level as well as shape its power spectrum based on tone map information provided by a target receiver, while the receiver has both an analog and digital AGC (Automatic Gain Control) in order to achieve enough gain to compensate for the overall attenuation.

In summary, the stagger link quality (SLQ) routing protocol disclosed herein combines three routing overhead reduction elements to reduce the multiple RREQ transmissions from nodes due to difference in route costs. The disclosed method has been shown to be agnostic to the routing metric and choice of reactive routing protocol. Methods to apply the algorithm to PLC and Wi-Fi based Smart Grid networks that use different reactive routing protocols and route metrics have been presented. Results show an improvement of up to 85% in terms of reduced network overhead. The disclosed algorithm is also shown to inter-operate with devices that do not implement the proposed algorithm.

REFERENCES

[1] O. Tonguz, N. Wisitpongphan, J. Parikh, F. Bai, P. Mudalige, and V. Sadekar. On the broadcast storm problem in ad hoc wireless networks. In Broadband Communications, Networks and Systems, 2006. BROADNETS 2006. 3rd International Conference on, October 2006. Reference:

[2] S. Zhang, W. Guo, and K. Wen. On the broadcast storm problems of routing in wireless sensor networks: A cross-layer design. In Wireless Communications, Networking and Mobile Computing, 2008. WiCOM '08. 4th International Conference on, pages 1-5, October 2008.

[3] X. M. Zhang, E. B. Wang, J. J. Xia, and D. K. Sung. A neighbor coverage-based probabilistic rebroadcast for reducing routing overhead in mobile ad hoc networks. IEEE Transactions on Mobile Computing, 12(3):424-433, March 2013.

Other Embodiments

In the description herein, some terminology is used that is specifically defined in the G3 and IEEE p1901.2 standards and/or is well understood by those of ordinary skill in the art in PLC technology. Definitions of these terms are not provided in the interest of brevity. Further, this terminology is used for convenience of explanation and should not be considered as limiting embodiments of the disclosure to the G3 and IEEE 1901.2 standards. One of ordinary skill in the art will appreciate that different terminology may be used in other encoding standards without departing from the described functionality.

For ease of explanation, embodiments were disclosed herein specifically in the context of PLC in which CSMA/CA is used for packet transmission As a person of ordinary skill in the art will recognize in light of this disclosure, however, certain techniques and principles disclosed herein may also be used in other communication environments. Another embodiment may use a transmission protocol that does not involve CSMA/CA, for example. In various embodiments, the systems and methods described herein may be applicable to a wide variety of communication environments, including, but not limited to, those involving wireless communications (e.g., cellular, Wi-Fi, WiMax, etc.), wired communications (e.g., Ethernet, etc.), Power Line Communications (PLC), or the like.

The techniques described in this disclosure may be implemented in hardware, software, firmware, or any combination thereof. Various combinations of hardware and/or software state machines may be used. If implemented in software, the software may be executed in one or more processors, such as a microprocessor, application specific integrated circuit (ASIC), field programmable gate array (FPGA), software state machines, or digital signal processor (DSP), for example. A stored program in an onboard or external (flash EEP) ROM (read only memory) or FRAM (ferroelectric random access memory), for example, may be used to implement aspects of the signal processing. The software that executes the techniques may be initially stored in a computer-readable medium such as a flash drive, a compact disc (CD), a diskette, a tape, a file, memory, or any other computer readable storage device and loaded at a manufacturing site for execution in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the disclosure should not be considered limited to the specific ordering of steps shown in the figures and/or described herein.

It is therefore contemplated that the appended claims will cover any such modifications of the embodiments as fall within the true scope and spirit of the disclosure.

What is claimed is:

1. A method for determining a transmission route in a network having a plurality of nodes, the method comprising:
   receiving by an intermediate node of the plurality of nodes multiple route request (RREQ) packets initiated by a source node that is targeted towards a destination node within the network, in which the multiple RREQs are received from a first set of nodes in proximity to the source node;
   waiting a randomized amount of wait time after first receiving the first one of the multiple RREQs;
   suppressing all but a single one of the multiple RREQs received by the intermediate node during each randomized wait time; and
   rebroadcasting the single one of the multiple RREQs with accumulated route information by the intermediate node after the wait time.

2. The method of claim 1, in which the wait time is proportional to a link quality indicator for a communication channel link between a node that transmitted the RREQ and the intermediate node.

3. The method of claim 1, in which the wait time is proportional to a number of hops between the source node that originated the RREQ and the intermediates.

4. The method of claim 1, in which the wait time has a minimum value that is sufficient to account for all rebroadcasts of the RREQ from the source node by the first set of nodes.

5. The method of claim 1, in which suppressing all but one RREQ selects an RREQ having a better quality accumulated route for rebroadcasting.

6. The method of claim 1, further including determining a cluster of nodes that have similar routing characteristics to the intermediate node; and
   suppressing all RREQ received by the intermediate node when the intermediate node receives a RREQ for the source node during the randomized wait time from a member node of the cluster that includes the intermediate node.

7. The method of claim 1, in which a RREQ received by a intermediate node includes received link quality for a second node that initiated the rebroadcast RREQ; the method further including:
   determining by the intermediate node that it cannot provide better routing performance than the second node; and
   suppressing all RREQ received by the intermediate node.

8. A communications device comprising:
   receiver logic configured to receive routing request (RREQ) packets from other communication devices in a network;
   transmitter logic configured to rebroadcast a RREQ to other communication devices in the network; and
   control logic coupled to the receiver and the transmitter configured to cause the communications device to:
   receive one or more copies of RREQ packets originated by a source node that is targeted towards a destination node within the network;
   wait a randomized amount of wait time after first receiving a first one of the one or more RREQs;
   suppress all but one RREQ received by the communication device during each randomized wait time; and
   rebroadcast the one RREQ with accumulated route information.

9. The communication device of claim 8, in which:
   the receiver includes an analog front end configured to receive orthogonal frequency division multiplexing (OFDM) symbols from a power line; and an OFDM demodulator; and
   the transmitter includes an analog front end configured to couple OFDM symbols to the power line, and a modulator configured to produce the OFDM symbols representative of data.

10. The communication device of claim 8, in which the wait time is proportional to a link quality indicator for a communication channel link between a node that transmitted the RREQ and the communication device.

11. The communication device of claim 8, in which the wait time is proportional to a number of hops between the source node that originated the RREQ and the communication device.

12. The communication device of claim 8, in which the wait time has a minimum value that is sufficient to account for all rebroadcasts of the RREQ from the source node by the first set of nodes.

13. The communication device of claim 8, in which suppressing all but one RREQ selects an RREQ having a better quality accumulated route for rebroadcasting.

14. The communication device of claim 8, in which the control logic is further operable to:
   determine that the communication device belongs to a cluster of nodes that have similar routing characteristics; and
   suppress all RREQ received by a the communication device when the communication device receives a RREQ for the source node during the randomized wait time from a member node of the cluster that includes the communication device.

15. The communication device of claim 8, in which a RREQ received by a the communication device includes received link quality for a second node that initiated the rebroadcast RREQ;
   in which the control logic is further configured to:
   determine the communication device cannot provide better routing performance than the second node; and
   suppress all RREQs received by the communication device.

16. A non-transitory computer-readable medium storing software instructions that, when executed by a processor, cause a method for performing transmission over a communication channel by a communication device to be performed, the method comprising:
   receiving one or more copies of RREQ packets initiated by a source node that is targeted towards a destination node within the network;
   waiting a randomized amount of wait time after first receiving a first one of the one or more RREQs;
   suppressing all but one RREQ received by the communication device during each randomized wait time; and
   rebroadcasting the one RREQ with accumulated route information after expiration of the randomized wait time.

17. The method of claim 16, in which the wait time is proportional to a link quality indicator for a communication channel link between a node that transmitted the RREQ and the communication device.

18. The method of claim 16, in which the wait time is proportional to a number of hops between the source node that originated the RREQ and the communication device.

19. The method of claim 16, in which the wait time has a minimum value that is sufficient to account for all rebroadcasts of the RREQ from the source node by the first set of nodes.

20. The method of claim 16, in which suppressing all but one RREQ selects an RREQ having a better quality accumulated route for rebroadcasting.

21. The method of claim 16, further including:
   determining that the communication device belongs to a cluster of nodes that have similar routing characteristics; and
   suppressing all RREQ received by a the communication device when the communication device receives a RREQ for the source node during the randomized wait time from a member node of the cluster that includes the communication device.

22. The method of claim 16, in which a RREQ received by the communication device includes received link quality for a second node that initiated the rebroadcast RREQ, the method further including:
   determining the communication device cannot provide better routing performance than the second node; and
   suppressing all RREQs received by the communication device.

* * * * *